(12) United States Patent
Nelson, Sr.

(10) Patent No.: US 6,233,779 B1
(45) Date of Patent: May 22, 2001

(54) MULTIPLE-BLADED WINDSHIELD WIPER

(76) Inventor: Lenardo Nelson, Sr., 8009 S. Richmond, Chicago, IL (US) 60652

( * ) Notice: Subject to any disclaimer, the term of this patent is extended or adjusted under 35 U.S.C. 154(b) by 0 days.

(21) Appl. No.: 09/359,492

(22) Filed: Jul. 23, 1999

(51) Int. Cl.[7] .................................. B60S 1/28; B60S 1/38
(52) U.S. Cl. ............... 15/250.41; 15/250.4; 15/250.451; 15/250.48
(58) Field of Search ................. 15/250.001, 250.003, 15/250.201, 250.31, 250.32, 250.361, 250.4, 250.41, 250.43, 250.44, 250.451, 250.452, 250.453, 250.454, 250.48, 245, 245.1, 250.33

(56) References Cited

U.S. PATENT DOCUMENTS

| | | | |
|---|---|---|---|
| 1,162,122 | 11/1915 | Yamada et al. | 15/250.22 |
| 2,569,635 | 10/1951 | Holmes | 15/250.22 |
| 2,648,087 | 8/1953 | Kiker | 15/250.22 |
| 2,689,369 | 9/1954 | Biek | 15/250.41 |
| 2,712,148 | 7/1955 | Cheshire | 15/250.22 |
| 2,787,803 | 4/1957 | Cella | 15/250.4 |
| 3,099,031 * | 7/1963 | Ludwig | 15/250.451 |
| 3,115,656 | 12/1963 | McKinstry | 15/121 |
| 3,139,644 | 7/1964 | Smith | 15/250.41 |
| 3,892,006 | 7/1975 | Yasumoto | 15/250.22 |
| 3,961,395 | 6/1976 | Journee | 15/250.361 |
| 4,094,037 * | 6/1978 | Karpp | 15/250.41 |
| 4,296,522 | 10/1981 | Brack | 15/250.361 |
| 5,732,437 * | 3/1998 | Jonasson et al. | 15/250.201 |

FOREIGN PATENT DOCUMENTS

| | | | |
|---|---|---|---|
| 2643360 * | 3/1978 | (DE) | 15/245 |
| 3527528 * | 2/1987 | (DE) . | |
| 524234 | 8/1940 | (GB) . | |
| 57446 * | 1/1937 | (NO) | 15/245 |
| 1162643 * | 6/1985 | (RU) | 15/250.48 |

* cited by examiner

Primary Examiner—Gary K. Graham
(74) Attorney, Agent, or Firm—Sonnenschein Nath & Rosenthal

(57) ABSTRACT

A multiple-bladed windshield wiper is disclosed in which a blade multiple edged is axially rotated in a support bracket to bring a fresh blade edge into use. The multi-edged blade has two edge elements which are received in a pair of U-shaped channels forming part of the bracket. A fresh blade may be brought into use by slidably removing the blade element from the channels in the bracket, rotating the blade, then reinserting the blade edges into the channels in the bracket.

6 Claims, 2 Drawing Sheets

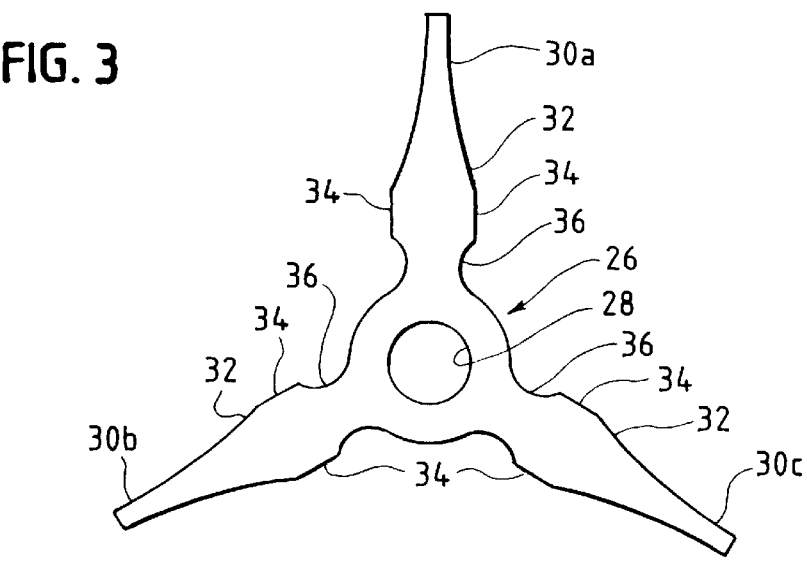
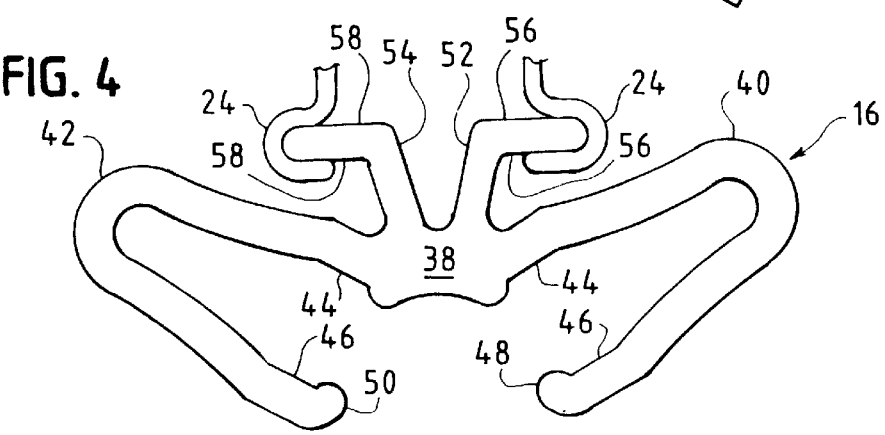
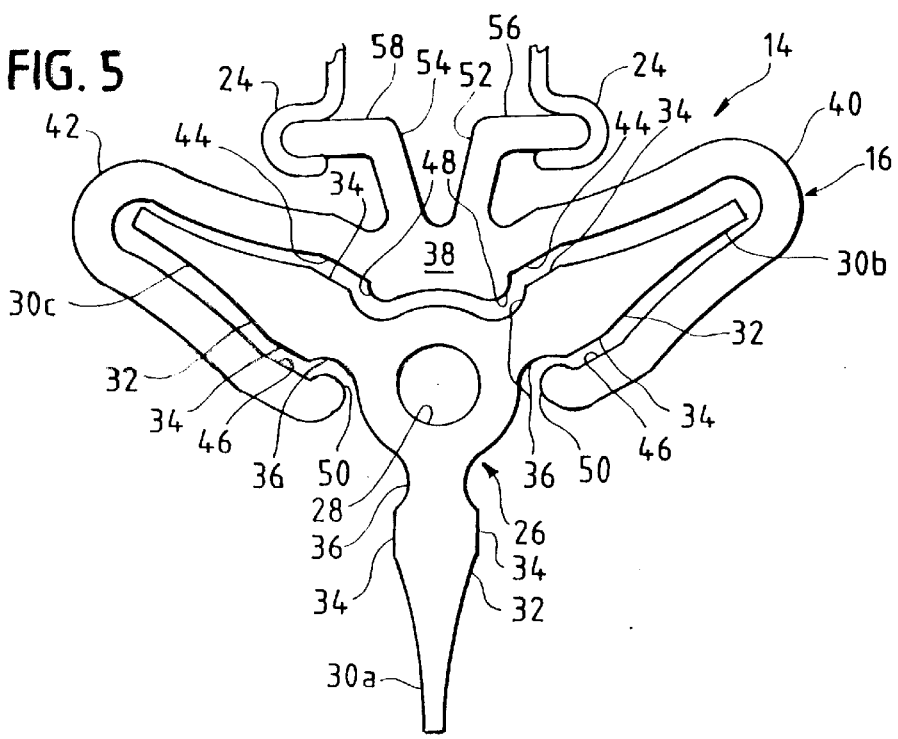

MULTIPLE-BLADED WINDSHIELD WIPER

BACKGROUND OF THE INVENTION

1. Field of the Invention

The present invention relates to windshield wipers and, more particularly, to a windshield wiper having multiple blade edges which may be individually and selectively brought into use.

2. Description of the Related Art

Wiper blades for vehicle windshields, headlights, and the like, are subject to wear which requires periodic renewal of the blades. In a conventional wiper assembly, a single flexible blade has a spine affixed along its entire length to an elongated holding member. The holding member is grasped at several points by an oscillating arm. When renewal of the blade is needed, the blade and holding member are removed from the arm, the blade is removed from the holding member, a separate new blade is assembled to the holding member, and the assembly of the new blade and holding member is attached to the arm. Alternatively, both the blade and the holding member are removed, discarded, and replaced with a new blade and holding member assembly.

Thus, conventional wiper assemblies require that the blade must be removed, discarded, and replaced each time the blade edge wears out. Due to the expense and inconvenience of obtaining and installing replacement blades, motorists are apt to postpone servicing the wipers.

Accordingly, there is a heretofore unmet need for a windshield wiper which may be easily and inexpensively serviced to renew the wiper blade edges.

SUMMARY OF THE INVENTION

The present invention satisfies the aforementioned need by providing a wiper having multiple blade edges that are selectively and individually brought into use. In a preferred embodiment, the wiper includes an elongated blade element having three radially extending, equally spaced blade edges. The wiper is slidably held in a wiper holding bracket, which, in turn, forms part of or is attached to a standard wiper support structure. The wiper holding bracket is configured such that the blade element is held in a selected one of multiple rotational positions with a single blade edge in wiping contact with the windshield. When a blade edge wears out, the blade element is slidably removed from the bracket, rotated with respect to the bracket, and slidably re-inserted into the bracket to bring a fresh blade edge into use. When all blade edges are worn out, the blade element is removed from the bracket and replaced.

These and other objects, advantages, and features of the present invention will be more fully understood and appreciated by reference to the written specification and appended drawings.

BRIEF DESCRIPTION OF THE DRAWINGS

FIG. 3 is and end view of the multi-edged wiper blade forming part of the present invention, taken along ling 3—3 of FIG. 2.

FIG. 4 is an end view of the bracket for holding the multi-edged wiper blade forming part of the present invention; and FIG. 5 is an end view of the assembled multi-edged wiper blade and bracket of the present invention, taken along line 5—5. in FIG. 1.

DESCRIPTION OF A PREFERRED EMBODIMENT

Figure 1:
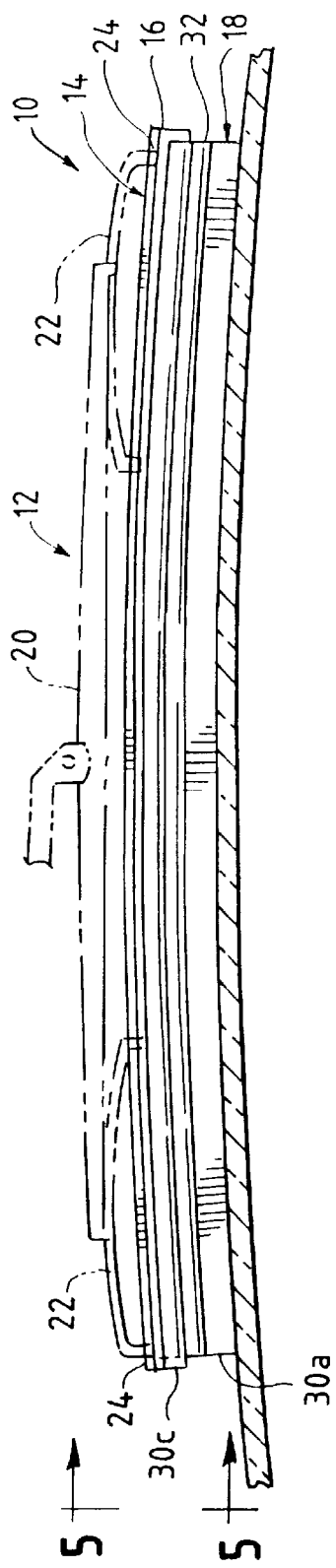
FIG. 1 is an elevation view of a windshield wiper according to the principles of the invention.

By way of disclosing a preferred embodiment, and not by way of limitation, there is shown in FIG. 1 a multi-edged windshield wiper assembly 10 in operative position against the surface of a windshield W. The invention is not limited to use with windshields, and may also be used with wipers for headlights, rear windows, and other surfaces.

In its general organization, the windshield wiper assembly 10 includes an oscillating arm 12 and a blade assembly 14. Blade assembly 14 includes an elongated support bracket 16 which extends substantially the entire length of the arm 12, and a blade subassembly 18 which extends substantially the entire length of the support bracket 16. Arm 12 is conventional, and includes central strut 20 with grasping elements 22 at each end of the central strut which is sufficiently rigid to maintain the wiper in effective wiping contact with the windshield W. As shown also in FIGS. 4 and 6, each end of each grasping element 22 is formed with retaining fingers 24 which straddle and grasp the support member 16.

Figure 2:
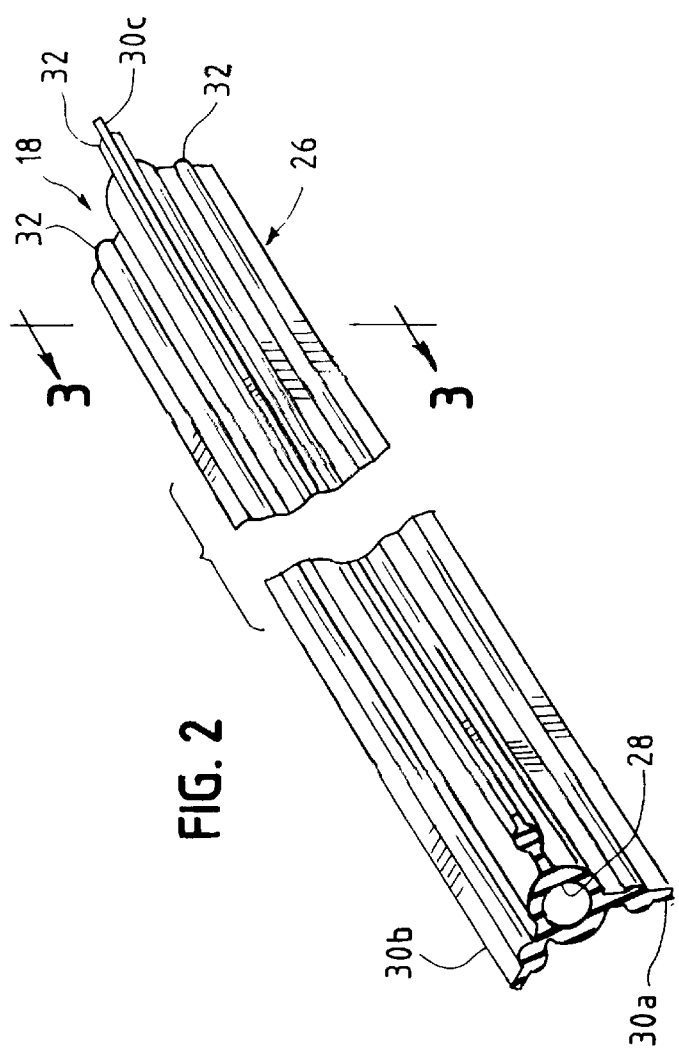
FIG. 2 is a perspective view of the blade element of the present invention.

Details of the blade subassembly 18 are shown in FIGS. 2 and 3. Blade element 26 is preferably composed of an axially elongated strip of flexible, resilient material, such as synthetic rubber to enable the wiper to conform to the contour of the windshield W. Blade element 26 is formed with a generally cylindrical, hollow central core running the entire length of the blade element. Three equally spaced blade edges 30a, 30b, 30c extend integrally and radially outwardly from the central core.

Each blade element 30a,b,c, includes a rib member 32 extending the length of each blade element. As seen more clearly in FIGS. 3 and 5, each rib member 32 in the illustrated embodiment comprises a substantially flat surface 34 on both sides of each blade edge 30a,b,c. An indented neck portion 36 flexibly connects each blade edge 30a,b,c to blade element 26.

Referring to FIGS. 4,5 and 6, bracket 16 is structured to slide over and support blade element 26, and includes a central elongated body portion 38 which is longitudinally dimensioned the same as blade element 26. Bracket 16 includes oppositely disposed, substantially U-shaped channel elements 40,42 extending outwardly from body portion 38. The interior of channels 40, 42 each include substantially flat portions 44, 46 on opposite sides of each channel 40, 42. The portion 38, forming an entrance to channels 40, 42, comprises inwardly directed nubs 48, 50, for purposes to be explained.

The upper extent of body portion 38 comprises a pair of longitudinally extending fastening elements 52, 54, which include horizontally extending fastening ribs 56, 58. As seen in FIGS. 1, 3 and 4, retaining fingers 24 extend from grasping element 22 and are constructed to slidably engage longitudinally extending fastening ribs 56, 58 to releaseably and flexibly secure bracket 16 strut 20.

To assemble multi-edged windshield wiper assembly 10 in accordance with the teachings of the present invention, two of the blades 30b,c of blade element 26 are slidably inserted into channel elements 40, 42, as illustrated in FIGS. 1 and 5, until blade element 26 and bracket 16 are engaged co-extensively. As seen in FIG. 5, blade edges 30b and 30c extend into the bend portion of U-shaped channels 40, 42, respectively. Flat surfaces 34 of blade edge 30b and 30c engage flat portions 44, 46 of channels 40, 42, respectively, while ribs 48, 50 extend into the curved section of neck portion 36 of blade element 26. Under actual assembly conditions, flat surfaces 34 of blade element 36 will substantially abut flat portions 44, 46. Also, nubs 48, 50 will substantially engage adjacent neck portions 36. However, FIG. 5 shows a space between respective flat surfaces 34 and flat portions 44, 46, and between nubs 48, 50 and adjacent neck portions 36 for purposes of clarity of illustration. Thus, when blade element 26 is properly inserted into bracket 26 (FIG. 5), blade edges 30b and 30c are held somewhat securely, and flexibly, in channels 40, 42 of bracket 16, while blade edge 30a extends downward to come into contact with windshield W. The insertion of blade element 26 into bracket 16 takes place while bracket 16 remains connected to strut 20 and grasping elements 22. As seen in FIGS. 1, 4 and 5, retaining fingers 24 of grasping elements 22 extend around longitudinally extending portions 56, 58 of fastening ribs 52, 54 respectively, to securely and slidably hold bracket 16 to grasping elements 22.

Blade edge 30a can expected to become worn and streak the windshield W after many hours of use. The present invention contemplates that rather than bear the cost of a new blade, blade element 26 is slidably removed from bracket 16, rotated 120 and re-inserted into bracket 16 with blade ends 30a and 30b extending into U-shaped channels 40, 42, respectively. Unused blade 30c now abuts windshield W. Thus, a fresh blade edge has been made available without the need for new parts and with a minimum of effort. When blade edge 30c becomes worn beyond efficient operation, the above process is repeated to expose blade edge 30b for contact with windshield W. After all blade edges 30a,b,c are worn, blade element 26 is slidably removed from bracket 16, and a new blade element 26 is installed as described above.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are define follows:

What is claimed is:

1. A multiple-bladed windshield wiper comprising:

an axially elongated support bracket having spaced apart first and second ends, said bracket member configured for attachment to an oscillating wiper arm;

an axially elongated blade element having spaced apart first and second ends and a plurality of radially extending blade edges, each blade edge including a longitudinally extending indented neck portion;

said support bracket including a pair of axially extending substantially U-shaped channel members; and two of said radially extending blade edges slidably and removably disposed in said pair of said channel members, respectively, one of said radially extending blade edges extending in a direction away from and beyond said support bracket;

said U-shaped channels including longitudinally extending nub elements adapted to engage adjacent indented neck portions to removably hold said blade element in said bracket when said blade element is inserted into said bracket.

2. The multiple-bladed windshield wiper of claim 1 wherein:

said blade element being held by said bracket in one of a plurality of rotational positions; and said blade element being selectively disengaged from said support bracket and rotated to bring a selected one of said plurality of blade edges into operating position in another of said rotational positions.

3. The multiple-bladed windshield wiper of claim 1, said blade edges each including axially extending rib members;

said bracket including rib engaging portions forming part of said U-shaped channels, said rib engaging portions adapted to engage said rib members when said blade element is inserted into said support bracket.

4. The multiple-bladed windshield wiper of claim 3, wherein:

said rib members each include at least one longitudinally extending flat surface; and said rib engaging portions of said U-shaped channel comprise corresponding flat portions to engage said flat surface of said rib members when said blade element is inserted into and held by said bracket.

5. The multiple-edged windshield wiper of claim 1 wherein:

said bracket includes longitudinally extending fastening elements; and said bracket is operatively connected to retaining fingers forming part of said wiper arm, said retaining fingers engaging said fastening elements to secure said bracket to said wiper arm.

6. A multiple-bladed windshield wiper comprising:

a support bracket having a pair of channel elements extending longitudinally in said support bracket each defining a channel; and an elongated multi-edged blade element having a plurality of radially extending blades, said blade element removably held by said support bracket, a plurality of the blades of said blade element slidably and removably engaged by said channel elements when said blade element is inserted in the channel elements of said support bracket, said pair of channel elements each including longitudinally extending nub elements for removably holding a blade therein, said nub elements of respective channel elements defining a reduced width entrance to their respective channel.

* * * * *